Dec. 9, 1930.                H. W. FLETCHER                1,784,094
                           VALVE OPERATING MEANS
                            Filed April 6, 1928
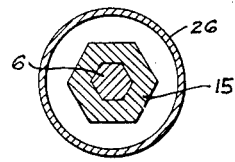
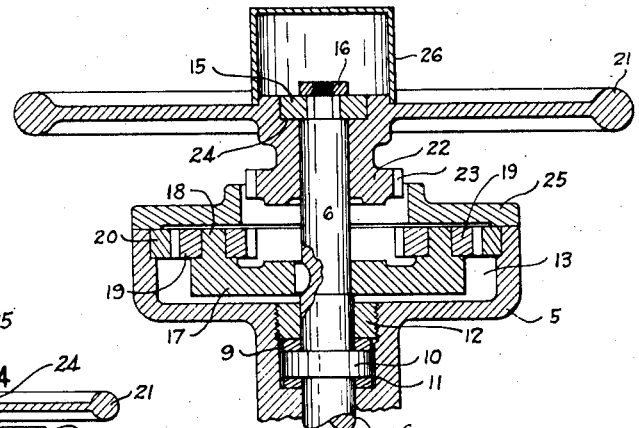
HAROLD W. FLETCHER
INVENTOR
BY Jesse R. Stone
ATTORNEY Patented Dec. 9, 1930

1,784,094

UNITED STATES PATENT OFFICE

HAROLD W. FLETCHER, OF HOUSTON, TEXAS, ASSIGNOR TO HUGHES TOOL COMPANY, OF HOUSTON, TEXAS, A CORPORATION OF TEXAS

VALVE-OPERATING MEANS

Application filed April 6, 1928. Serial No. 267,891.

My invention relates to valves of the gate-valve type and pertains particularly to valves which are intended to work under fluid pressure in the line where the valve is installed.

In the operation of gate valves in lines where the fluid is under pressure, it is frequently desired to close the valve quickly to prevent the flow through the line. When this is done, however, the pressure of the fluid against the gate of the valve, as it enters the stream of fluid is frequently so strong as to set up a high friction between the gate and its seat and thus render it extremely difficult to move the valve without some means of exerting additional power upon the valve operating means. Thus delay is experienced in closing the valve at a time when such delay may cause serious damage.

It is an object of the invention to provide a valve of the character stated which can be operated quickly under pressure. It is desired to provide a valve operating device by means of which the valve can be opened or closed quickly where the pressure is not too great, but which can be quickly adjusted for more powerful operation when the friction becomes excessive due to high pressures.

The inventive idea consists in providing a valve stem upon which is installed an operating means such as a hand wheel or lever which is adapted to engage directly with the stem for rotating the same, or which may also be connected to said stem through a speed reduction means whereby a greater force may be exerted upon the stem at a sacrifice of speed of rotation.

Referring to the drawing, a preferred embodiment of my invention is shown. Fig. 1 is a central vertical section through a valve employing my invention. Fig. 2 is an enlarged detail of the upper end of Fig. 1, illustrating the handle in a different position.

Fig. 3 is a transverse section upon the plane 3—3 of Fig. 1.

Fig. 4 is a similar section on the plane 4—4 of Fig. 1.

The invention may be employed with all common types of gate valves with rising or nonrising stems, but I have shown it as applied to one in which the stem has no longitudinal movement. The body of the valve includes a connecting member 1 adapted to be engaged within a string of pipe, the ends being threaded at 2 for that purpose.

Centrally of the body is a downwardly tapered seat 3 to receive a gate valve 4 tapered to fit said seat. Above the seat the valve bonnet 28 is of ordinary construction and terminates in a cylindrical housing 5 for the valve stem 6. Within said housing is a chamber 7 to receive plastic packing which may be introduced through a lateral opening, normally closed by the plug 8. Said packing serves to make a fluid-tight closure about the valve stem while said stem is moved.

Above the packing, the housing is recessed at 9 to accommodate a flange 10 upon the valve stem. Anti-friction washers 11 may be provided above and below the said flange and a threaded disc 12 serves to close the upper end of said recess.

Above the recess 9, the housing is flared or dished outwardly to provide a chamber 13 between the outer walls and the stem.

The valve stem 6 has a steep-pitch, multiple thread 14 on its lower end to engage within an upper hub upon the valve so that the rotation of said stem will cause a rapid vertical movement of the valve. The flange 10 of the stem prevents vertical movement of the stem during rotation. At the upper end of the stem is a polygonal washer or head 15 set non-rotatably upon the stem as seen from Fig. 4. A lock nut 16 is screwed upon the reduced upper end of the stem to hold the head firmly in position.

Upon the stem within the housing is a spider 17, keyed to the stem to rotate therewith. Said spider has a plurality of upwardly projecting posts 18 thereon, upon which are rotatably mounted the pinions or gears 19.

A stationary ring gear 20 is fixed to the inner wall of the chamber 13 and the pinions 19 on the spider are adapted to mesh with said ring gear so that the rotation of said pinions will cause them to travel around on the said stationary ring gear 20.

A handle or operating means is employed to rotate the stem. I have shown a handwheel 21, having a central hub 22 fitting slidably and rotatably upon the stem. It has an upper polygonal socket 24 to fit the head 15. Its lower end has thereon a radially extending gear 23 formed to fit between the pinions 19 and engage therewith when said handle is depressed.

The chamber 13 is closed at its upper end by an annular plate 25, the central opening in which is large enough to allow the gear 23 upon the handle to pass therethrough. A cap 26 may be mounted upon the handle protecting the upper end of the stem as shown.

In operation the handle 21 will normally be raised to bring the socket 24 into engagement with the head 15 of the stem. The rotation of the handle in this position will screw the valve 4 rapidly in a vertical direction, either in or out depending upon the direction of rotation of the stem. If it is found that the pressure of fluid upon the valve is so great as to cause excessive friction between the valve and its seat, resisting the rotation of the stem sufficiently to prevent the operator from manipulating the handle, the hand-wheel may be forced inwardly to bring the gear 23 into mesh with the pinions 19, whereby the rotation of the handle will exert a more powerful action upon the stem through the reduction gears 19 and 20. This will enable the operator to proceed at once to move the valve as desired.

The use of my improvement enables the ordinary operator to control the valve even under extremely high pressures so that no delay may occur at times when delay would be hazardous. No extra tools are required, no removal of the hand wheel, and no application of outside power need be resorted to. The device is therefore of value whenever heavy pressures may be encountered; as in drilling wells, high pressure pipe lines, and the like.

What I claim as new is:

1. In a device of the character described, the combination of a rotatable stem, a housing for said stem, and means to rotate said stem at different speeds, said rotating means including a handle slidable and rotatable on said stem, means operative when said handle is in one position, to engage said handle non-rotatably with said stem, a spider fixed to said stem, a speed reduction gearing associated with said spider, and means on said handle adapted, when in a different position, to engage said spider through said speed reduction gearing for the purpose described.

2. In a device of the character described, the combination of a rotatable stem, and means to rotate said stem at a plurality of speeds including a handle slidable and rotatable on said stem, a spider fixed to said stem, speed reduction gearing associated with said spider, means operative when said handle is in raised position to connect said handle nonrotatably, directly with said stem, and means operative when said handle is in a lower position to connect said handle to said stem through said speed reduction gearing.

3. In a device of the character described, a stem having a threaded connection therewith, a housing for said stem, means to prevent longitudinal movement of said stem, a polygonal head on said stem, a gear fixed on said stem below said head, a handle slidable on said stem to engage said gear as desired, and an inner stationary gear on said housing cooperating with the gear on said stem, whereby said handle may rotate said stem at different rates of speed.

4. In a gate valve structure, a vertically movable member, a stem having a steep multiple thread thereon engaging with said member, a housing for said stem, the upper end of said housing having an enlarged chamber, the walls of which are spaced from said stem, means to prevent longitudinal movement of said stem, a head on said stem spaced above said housing, a gear spider fixed to said stem within said chamber, a gear ring on the inner walls of said chamber, pinions on said spider meshing with said gear ring, a handle having a recess to engage said head, and a gear fixed on said handle adapted to be moved with said handle into engagement with said pinions for the purpose described.

5. In a gate valve structure, a vertically movable member, a valve stem threaded for connection therewith, a housing for said stem having an internal gear fixed thereon spaced from said stem, means to prevent longitudinal movement of said stem, a head on said stem, a gear spider fixed on said stem within said housing, pinions thereon engaging said internal gear, a handle slidable and rotatable on said stem, means on said handle to nonrotatably engage said stem and additional means on said handle to engage said pinions to move said stem.

6. In a gate valve structure, a vertically movable member, a stem operatively engaged therewith to move said member, a housing for said stem, a flange on said stem engaging said housing to prevent longitudinal movement of said stem, a stem-operating member normally slidable and rotatable on said stem, means to engage said member directly to said stem, a speed reduction device connected with said stem, and means on said operating member to engage said speed reduction device to rotate said stem.

7. In a gate valve structure, a vertically movable member, a stem operatively engaged therewith to move said member, a housing for said stem, a stem-operating member normally slidable and rotatable on said stem, means to engage said member directly to said stem, a speed-reduction device connected with said stem, and means on said operating member to engage said speed reduction device to rotate said stem.

8. In a gate valve structure, a vertically movable member, a stem operatively engaging with said member to move said member to or from its seat, operating means on said stem adapted to be moved in one direction to engage directly therewith and speed reduction means on said stem formed to interengage with said operating means when said operating means is moved in the opposite direction whereby said stem may be moved to control said valve.

9. In a gate valve structure, a vertically movable member, a stem operatively engaging with said member to move said member to or from its seat, operating means on said stem and movable on said stem, means adapted to cooperate therewith to connect said operating means directly to said stem and means cooperating with said operating means when said operating means is in a different position to exert a more powerful effort on said stem at a slower speed.

10. In a valve structure, a valve, a stem operatively engaging said valve to move said valve to and from its seat, means to rotate said stem through direct engagement therewith when in one position, said means being slidable on said stem and adapted to raise said stem through a torque multiplying connection when in another position.

In testimony whereof I hereunto affix my signature this 26 day of March, A. D. 1928.

HAROLD W. FLETCHER.